United States Patent [19]

Gilpin et al.

[11] Patent Number: 5,319,184

[45] Date of Patent: Jun. 7, 1994

[54] TIP ASSEMBLY FOR A BAR CODE SCANNER

[75] Inventors: David W. Gilpin, Everett; David R. Trine, Seattle, both of Wash.

[73] Assignee: Intermec Corporation, Everett, Wash.

[21] Appl. No.: 859,041

[22] Filed: Mar. 26, 1992

[51] Int. Cl.⁵ .......................... G06K 7/10; H01J 5/16
[52] U.S. Cl. ................................. 235/472; 235/462; 250/227.13; 250/566
[58] Field of Search ............... 235/472, 462; 250/566, 250/227.13

[56] References Cited

U.S. PATENT DOCUMENTS

| | | | |
|---|---|---|---|
| 3,868,514 | 2/1975 | Israelsson | 250/566 |
| 3,904,277 | 9/1975 | Phillips et al. | 350/252 |
| 3,911,270 | 10/1975 | Traub | 250/227 |
| 3,916,184 | 10/1975 | Turner et al. | 250/227 |
| 4,031,358 | 6/1977 | Thorniley | 235/473 |
| 4,107,540 | 8/1978 | Hillman | 235/472 |
| 4,109,146 | 8/1978 | Hillman | 235/472 |
| 4,575,627 | 3/1986 | Pease et al. | 235/472 |
| 4,698,490 | 10/1987 | Nakase et al. | 235/472 |
| 4,748,319 | 5/1988 | Sasaki et al. | 235/472 |
| 5,099,109 | 3/1992 | Ishikawa et al. | 235/472 |
| 5,162,640 | 11/1992 | Ishikawa | 235/472 |

FOREIGN PATENT DOCUMENTS 3109296 9/1982 Fed. Rep. of Germany ...... 235/472

OTHER PUBLICATIONS

IBM Technical Disclosure Bulletin, "Self Adjusting Swivel Tip for Light Pen", vol. 11, No. 12, May 1969.

*Primary Examiner*—E. Rollins Cross
*Assistant Examiner*—Erick Solis
*Attorney, Agent, or Firm*—Seed and Berry

[57] ABSTRACT

A tip assembly for a bar code scanner having a concentric design which prevents rotational, axial and tilting movement among the components of the tip assembly. A tip housing with an internal detent is snap fitted over a scanner housing having multiple cantilevered, flexible beams, each with a circumferential groove adapted to receive the detent therein. An optical assembly housing containing optics is received within the scanner housing, between the flexible beams thereof. The optical assembly housing has tabs extending outwardly to mate with corresponding recesses in the beams to prevent rotation of the optical assembly relative to the scanner housing. The tip housing is sized to frictionally engage and press the beams inward so they frictionally engage the optical assembly housing. A scanner barrel is positioned about the scanner housing and extends to a position outward of the lip portion of the tip housing to prevent outward travel of the beams, thus locking the tip assembly components securely together.

22 Claims, 2 Drawing Sheets

TIP ASSEMBLY FOR A BAR CODE SCANNER

DESCRIPTION

1. Technical Field

The present invention relates to bar code scanners and, more particularly, to a scanner tip assembly that is releasably retained in position on the remainder of the scanner.

2. Background of the Invention

A typical bar code scanner employs an optical assembly enclosed within a scanner housing. The optical assembly is positioned in the scanner housing at an end thereof with an opening. A tip having a transparent window is attached to the scanner housing at the opening to protect the optical assembly while allowing light reflected from a bar code to pass through the window and be received by the optical assembly. The window is normally a jewel fashioned to focus the light reflected from the bar code onto a light sensor of the optical assembly. The optical assembly is designed to be positioned a preselected distance from the bar code so as to receive an optimum image of the bar code. Therefore, any movement of the tip, and thus the focusing window relative to the optical assembly, may result in a somewhat less than the optimum image being received by the light sensor, depending on the degree of the movement. Typically, the tip is either screwed onto the scanner housing or partially inserted into the scanner housing. While these prior art tips may adequately serve to enclose and protect the optical assembly, these tips suffer various deficiencies.

A tip that screws onto the scanner housing is much more difficult to assemble than one that can be simply inserted into the scanner housing. A screw-on tip makes it difficult to assemble the scanner using automation. In addition, with prolonged use of the scanner the tip tends to unscrew from the scanner housing, which distorts the image of the bar code received by the optical assembly.

With non-screw tips there is often insufficient friction to prevent the tip from partially pulling away from or separating from the scanner housing during use and handling. In addition, there is often insufficient lateral support to prevent the tip from yawing or tilting on the scanner housing. Such axial and/or yaw movement of the tip can distort the image of the bar code and cause the scanner to incorrectly read the bar code.

SUMMARY OF THE INVENTION

According to the present invention, a tip assembly for a bar code scanner is provided to allow assembly to be accomplished using automation. The tip assembly employs various features that prevent axial, rotational, and yaw movement within the tip assembly.

The tip assembly includes an optical assembly enclosed within a scanner housing. The scanner housing has a plurality of beams extending from a body portion. The tip assembly includes tip housing snapped onto the beams of the scanner housing. A scanner casing overlaps a lip portion of the tip housing such that yaw movement of the tip housing is restricted between the scanner barrel and scanner housing. The tip housing has an annular protrusion formed on its interior which mates with an annular groove in the scanner housing to prevent axial movement between the tip housing and scanner housing. The optical assembly has projecting tabs that fit within notches formed in the scanner housing so as to restrict rotational movement of these scanner housing relative to the optical assembly.

DETAILED DESCRIPTION OF THE INVENTION

Figure 1:
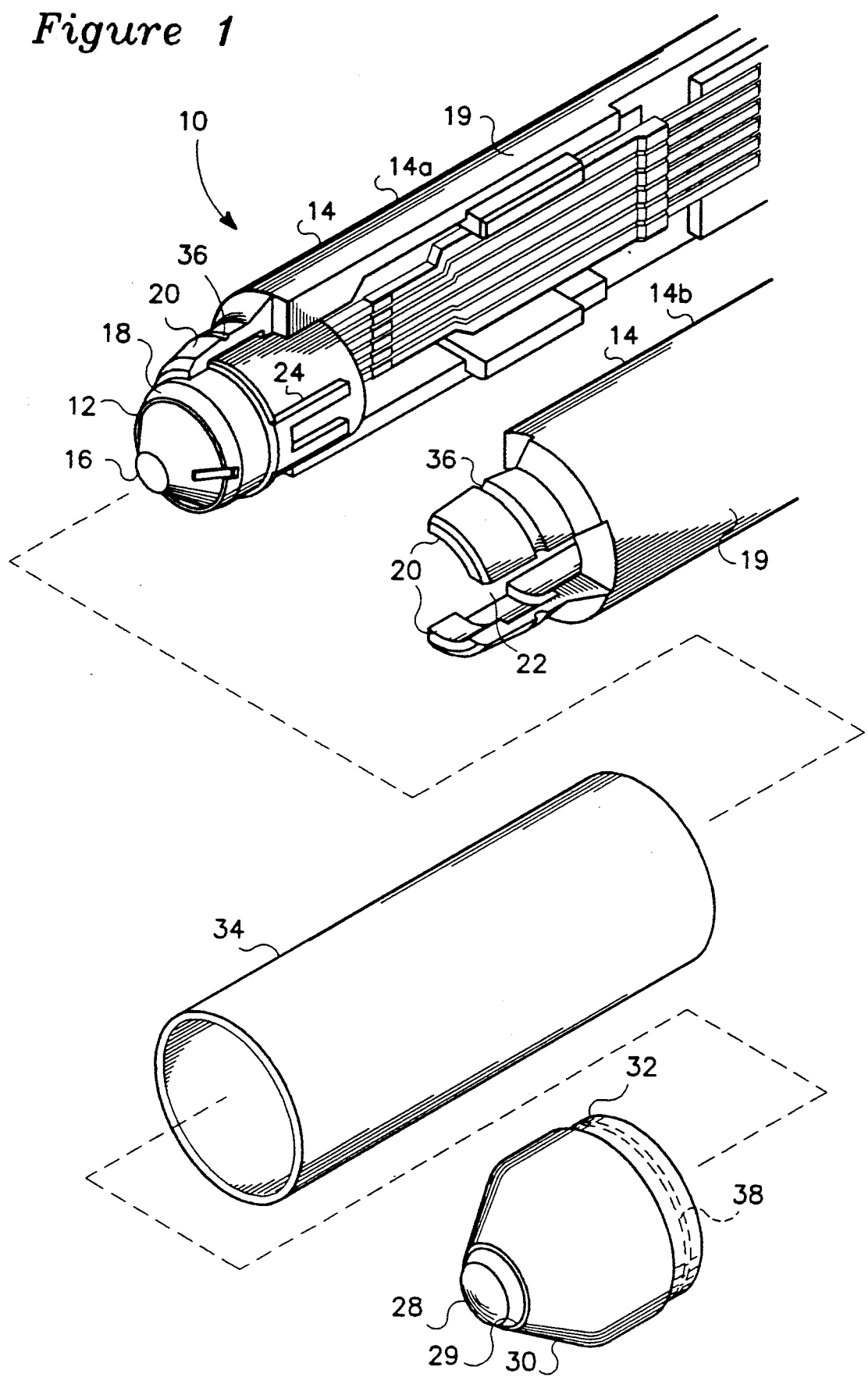
FIG. 1 is a fragmentary, exploded isometric view of a tip assembly of the present invention.
Figure 2:
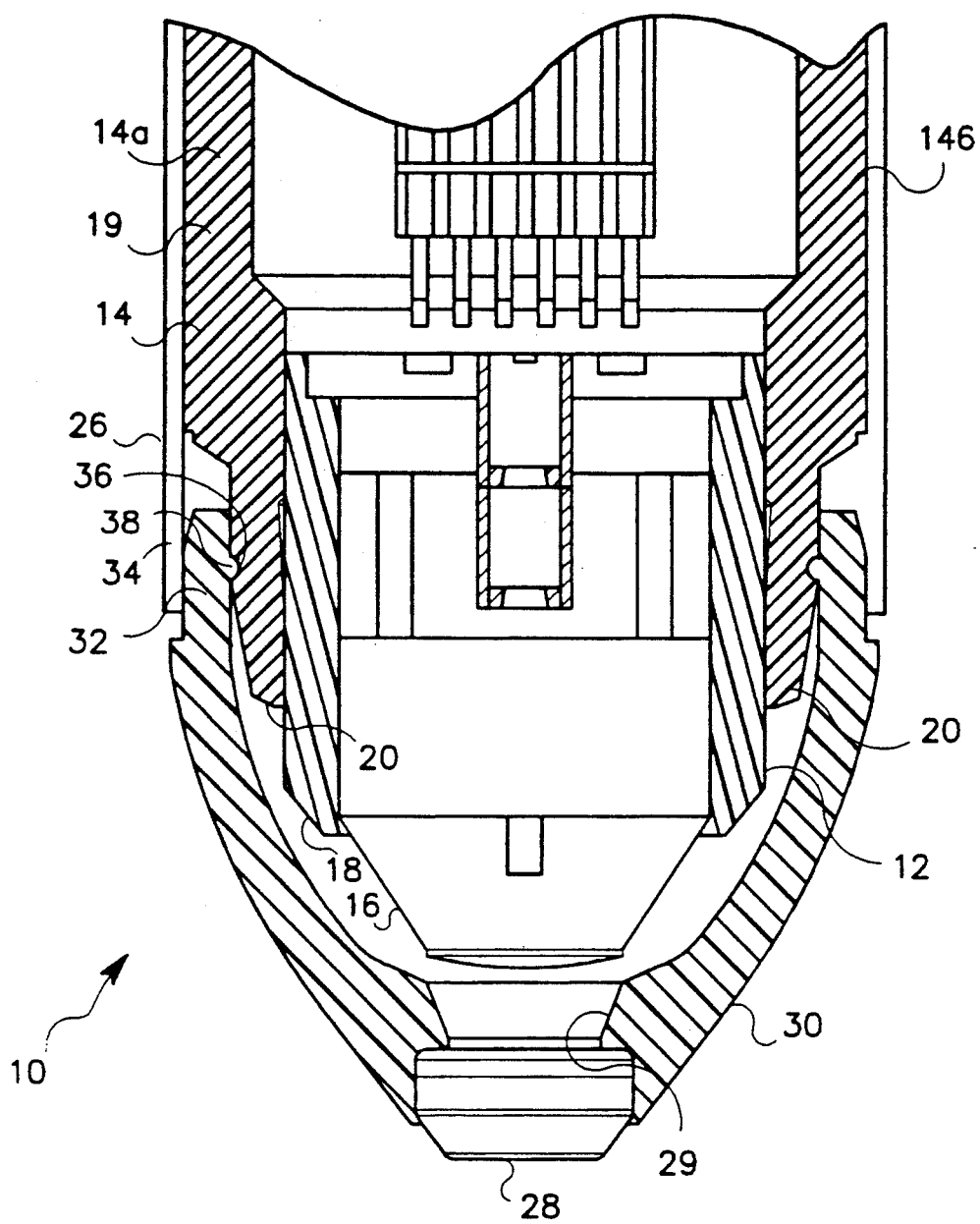
FIG. 2 is an enlarged cross-sectional view of the inventive tip assembly.

As shown in FIG. 1, a tip assembly 10 for a bar code scanner includes an optical assembly 12, a scanner housing 14 which surrounds a portion of the optical assembly, an outer tubular scanner barrel 34 into which the scanner housing and optical assembly are inserted, and a tip housing 30, which is positioned to cover an open end of the scanner barrel toward which the optical assembly is located when the tip assembly is fully assembled (as shown in FIG. 2). The scanner housing 14 has a first half 14a and a second half 14b, which are attached together when the tip assembly 10 is assembled. The optical assembly 12 includes optics 16 fixedly retained within a generally cylindrical optical assembly housing 18. Each of the halves 14a and 14b of the scanner housing 14 includes a cylindrical body portion 19 and two beams 20 which extend longitudinally from the scanner housing body portion 19. The beams 20 each have one end formed integral with the body portion 19 and a free end, and are made from a somewhat resilient material to allow their flexure. Between the beams 20 is a gap 22 that mates with a corresponding tab 24 extending laterally outward from the optical assembly housing 18. This tab-in-gap arrangement prevents rotational movement of the scanner housing 14 with respect to the optical assembly housing 18.

The tip assembly 10 includes a jewel optical window 28 mounted at an end opening 29 of the tip housing 30. The tip housing 30 ends in a cylindrical extension lip 32 with an outer circumference sized to permit it to fit within the open end of the tubular scanner barrel 34. When both halves 14a and 14b of the scanner housing 14 are in place around the optical assembly 12, extension lip 32 of the tip housing 30 snap fits onto the beams 20 of the scanner housing 14 such that the extension lip fits snugly between the scanner housing 14 and the scanner barrel 34. The internal circumference of the extension lip 32 of the tip housing 30 is smaller than an external circumference defined by the position of the beams 20 so that a compressive force is directed from the tip housing to the scanner housing 20. The compressive force produces relatively high friction between the tip housing 30 and the beams 20 which restricts axial movement between the tip housing 30 and scanner housing 14. To further restrict axial movement between the tip housing 30 and the scanner housing 14, the beams 20 each have a circumferentially extending groove 36 on an outer side thereof that mates with an inwardly projecting annular detent 38 on the extension lip 32 of the tip housing 30. The combination of the detent 38 fitting within the groove 36 under the compressive force that the tip housing 30 applies to the scanner housing 14, and the friction between the tip housing and the beams 20, results in a highly secure fit with little or no axial movement or yaw movement of the tip housing 30 relative to the scanner housing 14.

In addition to preventing axial movement of the tip housing 30 and rotational movement of the optical assembly housing 18 relative to the scanner housing 14, the tip assembly 10 is designed so that yaw or tilting of the tip housing 30 relative to the scanner housing 14 is prevented. To help hold the tip housing 30 in place against axial and yaw (i.e., tilting) movement, the extension lip 32 of the tip housing 30 is between beams 20 and the scanner barrel 34. The resulting scanner has the optical assembly housing, the scanner housing, the tip housing, and the scanner casing in concentric arrangement along a common longitudinal axis. By providing increased restraint against tilting of the optical assembly housing 18 over prior art designs, the window 28 is securely held in position directly in front of the optics 16 to provide an undistorted view of a bar code to be read by the optics.

The beams 20 with gaps 22 between are used instead of a solid sleeve structure so that the compressive force exerted by the tip housing 30 on the beams 20 will cause the beams to flex inwardly. When the beams 20 flex inwardly they transfer a part of the compressive force exerted by the tip housing 30 to the optical assembly housing 18. This securely holds the tabs 24 of the optical assembly 18 within the gaps 22 to provide a secure fit and restrict movement of the optical assembly 12 relative to the scanner housing 14.

In the preferred embodiment, the beams 20 are substantially equally spaced about the body portion 19 of the scanner housing 14 so that the forces exerted on the optical assembly housing 18 will be substantially uniform around its entire circumference when the tip housing 30 is in place on the beams.

It should be appreciated that the embodiment disclosed may be substantially modified without departing from the invention. For example, the circumferences of the extension lip 32 and the beams 20 may be altered so that a lesser compressive force is exerted by the tip housing 30 on the scanner housing 14 since too great of a compressive force to prevent axial movement may make it more difficult than desired to remove the tip housing 30 once snapped into place. Of course, the extension lip 32 and the beams 20 may be sized so that no compressive force is exerted so that unwanted axial movement is prevented only by the action of the detent 38 of the extension lip 32 engaging the grooves 36 of the beams 20. Regardless of the magnitude of the compressive force, the tip assembly restricts axial, rotational and yaw movements while allowing the tip housing to be released from the scanner housing when desired for repair or replacement.

From the foregoing it will be appreciated that, although specific embodiments of the invention have been described herein for purposes of illustration, various modifications may be made without deviating from the spirit and scope of the invention. Accordingly, the invention is not limited except as by the appended claims.

We claim:

1. A tip assembly for a bar code scanner, comprising:
   a scanner housing having a body portion and at one end thereof a plurality of resilient beams extending generally longitudinally from the body portion; and
   a unitary tip housing having an open end portion surrounding and engaging an outward facing portion of the beams, the tip housing end portion having an interior sized to apply an inwardly directed force on the beams.

2. The tip assembly of claim 1 wherein the beams are circumferentially spaced substantially equally about the body portion of the scanner housing.

3. The tip assembly of claim 1 wherein the tip housing has a first mating member and the scanner housing has a second mating member that mates with the first mating member to restrict axial movement of the tip housing relative to the scanner housing.

4. The tip assembly of claim 3 wherein the first mating member is an inwardly extending detent and the second mating member is a groove sized and positioned to receive the detent to restrict axial movement of the tip housing relative to the scanner housing.

5. The tip assembly of claim 4 wherein the detent extends circumferentially about an interior wall of the tip housing.

6. The tip assembly of claim 1, further including an optical assembly positioned at least partially within the scanner housing with the beams of the scanner housing applying an inwardly directed force on the optical assembly in response to the tip housing force applying an inwardly directed force on the beams.

7. The tip assembly of claim 1, further includes an optical assembly having at least one first stop member and the scanner housing has a second stop member that mates with the first stop member to prevent rotational movement of the optical assembly relative to the scanner housing.

8. A tip assembly for a bar code scanner, comprising:
   a scanner housing having a body portion and at one end thereof a plurality of resilient beams extending generally longitudinally from the body portion; and
   a tip housing having an open end portion surrounding and engaging an outward facing portion of the beams, the tip housing end portion having an interior sized to apply an inwardly directed force on the beams; and
   wherein the end portion of the tip housing is an annular lip that extends fully around the beams, and the tip assembly further includes a scanner barrel within which the scanner housing is positioned with the beams positioned inward of the scanner barrel to define an annular space therebetween, the annular lip being positioned in the annular space and biased into frictional engagement with the scanner barrel by the beams.

9. A tip assembly for a bar code scanner, comprising:
   a scanner housing having a body portion and at one end thereof a plurality of resilient beams extending generally longitudinally from the body portion; and
   a tip housing having an open end portion surrounding and engaging an outward facing portion of the beams, the tip housing end portion having an interior sized to apply an inwardly directed force on the beams;
   wherein the tip housing has a first mating member and the scanner housing has a second mating member that mates with the first mating member to restrict axial movement of the tip housing relative to the scanner housing; and
   wherein the end portion of the tip housing is an annular lip that extends fully around the beams, and the tip assembly further includes a scanner barrel within which the scanner housing is positioned with the beams positioned inward of the scanner barrel to define an annular space therebetween, the first mating member being positioned on the annular lip.

10. A tip assembly for a bar code scanner, comprising:
a scanner housing having a body portion and at one end thereof a plurality of resilient beams extending generally longitudinally from the body portion; and
a tip housing having an open end portion surrounding and engaging an outward facing portion of the beams, the tip housing end portion having an interior sized to apply an inwardly directed force on the beams;
an optical assembly positioned at least partially within the scanner housing with the beams of the scanner housing applying an inwardly directed force on the optical assembly in response to the tip housing force applying an inwardly directed force on the beams; and
wherein the optical assembly has at least one outwardly projecting tab and between two of the beams is a gap sized and positioned to receive the tab therein to prevent rotational movement of the optical assembly relative to the scanner housing.

11. A tip assembly for a bar code scanner, comprising:
a scanner housing having a body portion and at one end thereof a plurality of resilient beams extending generally longitudinally from the body portion; and
a tip housing having an open end portion surrounding and engaging an outward facing portion of the beams, the tip housing end portion having an interior sized to apply an inwardly directed force on the beams;
an optical assembly having at least one first stop member and the scanner housing has a second stop member that mates with the first stop member to prevent rotational movement of the optical assembly relative to the scanner housing; and
wherein the first stop member is an outwardly projecting tab and the second stop member is a gap sized and positioned to receive the tab therein.

12. A tip assembly for a bar code scanner, comprising:
an optical assembly housing;
a scanner housing having an end portion at least partially surrounding the optical assembly housing;
a tip housing having an end portion surrounding the end portion of the scanner housing; and
a scanner barrel surrounding the end portion of the tip housing such that the tip housing portion is sandwiched between the scanner housing portion and the scanner barrel.

13. The tip assembly of claim 12 wherein the scanner housing has a body portion and the end portion of the scanner housing is a plurality of resilient beams extending longitudinally from the body portion.

14. The tip assembly of claim 13 wherein the beams are circumferentially spaced substantially equally about the body portion of the scanner housing.

15. The tip assembly of claim 12 wherein the end portion of the tip housing has an interior sized to apply a compressive force on the scanner housing.

16. The tip assembly of claim 12 wherein the tip housing has a first mating member and the scanner housing has a second mating member that mates with the first mating member to restrict axial movement of the tip housing relative to the scanner housing.

17. The tip assembly of claim 17 wherein the first mating member is an inwardly extending detent and the second mating member is an external groove sized and positioned to receive the detent to restrict axial movement of the tip housing relative to the scanner housing.

18. The tip assembly of claim 17 wherein the detent extends circumferentially about an interior wall of the tip housing.

19. The tip assembly of claim 16 wherein the end portion of tip housing is an annular lip that extends fully around the end portion of the scanner housing and the first mating member is positioned on the extension lip.

20. The tip assembly of claim 13 wherein the end portion of the tip housing has an interior sized to apply an inwardly directed force on the beams and the beams apply an inwardly directed force on the optical assembly housing in response to the inwardly directed force applied on the beams by the end portion of the tip housing.

21. The tip assembly of claim 12 wherein the optical assembly housing has a first stop member and the scanner housing has a second stop member that mates with the first stop member to prevent rotational motion of the scanner housing relative to the optical assembly housing.

22. The tip assembly of claim 21 wherein the first stop member is an outwardly projecting tab and the second stop member is a gap sized and positioned to receive the tab therein.

* * * * *

UNITED STATES PATENT AND TRADEMARK OFFICE
CERTIFICATE OF CORRECTION

PATENT NO. : 5,319,184
DATED : Issued June 7, 1994
INVENTOR(S) : David W. Gilpin and David R. Trine It is certified that error appears in the above-identified patent and that said Letters Patent is hereby corrected as shown below:

In column 6, claim 17, line 20, please delete "17" and substitute therefor --16--.

Signed and Sealed this

Twentieth Day of September, 1994

Attest:

BRUCE LEHMAN

Attesting Officer · Commissioner of Patents and Trademarks